United States Patent [19]

Harwood

[11] E Patent Number: Re. 33,370

[45] Reissued Date of Patent: Oct. 9, 1990

[54] STAMP FORMED MUFFLER

[75] Inventor: Jon Harwood, Toledo, Ohio

[73] Assignee: AP Parts Manufacturing Company, Toledo, Ohio

[21] Appl. No.: 350,136

[22] Filed: May 10, 1989

Related U.S. Patent Documents

Reissue of:

[64] Patent No.: 4,700,806
Issued: Oct. 20, 1987
Appl. No.: 934,642
Filed: Nov. 25, 1986

[51] Int. Cl.[5] ..... F01N 1/02; F01N 7/18

[52] U.S. Cl. ..... 181/282; 181/239; 181/250; 181/252; 181/272

[58] Field of Search ..... 181/239, 241–255, 181/266–269, 272, 276, 282

[56] References Cited

U.S. PATENT DOCUMENTS

| | | | |
|---|---|---|---|
| 705,357 | 7/1902 | Keating . | |
| 1,110,040 | 9/1914 | Chatain . | |
| 2,484,826 | 10/1949 | Harley . | |
| 2,484,827 | 10/1949 | Harley . | |
| 2,658,580 | 11/1953 | Trembley . | |
| 2,860,722 | 11/1958 | Gerstung . | |
| 2,902,109 | 9/1959 | Burgess et al. . | |
| 2,943,695 | 7/1960 | Jeffords | 181/243 |
| 3,125,182 | 3/1964 | Earley . | |
| 3,140,755 | 7/1964 | Tranel | 181/282 |
| 3,158,222 | 11/1964 | Richmond | 181/273 |
| 3,176,791 | 4/1965 | Betts et al. | 181/260 |
| 3,198,284 | 8/1965 | Powers . | |
| 3,220,508 | 11/1965 | Nordquest et al. . | |
| 3,412,825 | 11/1968 | Hall . | |
| 3,638,756 | 2/1972 | Thiele | 181/245 |
| 3,650,354 | 3/1972 | Gordon . | |
| 3,709,320 | 1/1973 | Höllerl et al. . | |
| 3,827,529 | 8/1974 | Frietzsche et al. . | |
| 3,852,041 | 12/1974 | Moore et al. | 60/299 X |
| 4,108,274 | 8/1978 | Snyder | 181/229 |
| 4,109,751 | 8/1978 | Kabele | 181/247 |
| 4,132,286 | 1/1979 | Hasui et al. | 181/265 |
| 4,165,798 | 8/1979 | Martinez | 181/268 |
| 4,396,090 | 8/1983 | Wolfhugel | 181/282 |
| 4,415,059 | 11/1983 | Hayashi | 181/250 |
| 4,418,790 | 12/1983 | Agnew | 181/268 |
| 4,422,519 | 12/1983 | Nomura et al. | 180/219 |
| 4,456,091 | 6/1984 | Blanchot | 181/282 |
| 4,523,660 | 6/1985 | Gaddi | 180/228 |
| 4,700,806 | 10/1987 | Harwood | 181/282 |
| 4,759,423 | 7/1988 | Harwood et al. | 181/282 |
| 4,760,894 | 8/1988 | Harwood et al. | 181/282 |
| 4,765,437 | 8/1988 | Harwood et al. | 181/282 |

FOREIGN PATENT DOCUMENTS

| | | |
|---|---|---|
| 59-155528 | 9/1984 | Japan . |
| 59-43456 | 12/1984 | Japan . |
| 61-155625 | 3/1985 | Japan . |
| 60-111011 | 6/1985 | Japan . |
| 61-14565 | 5/1986 | Japan . |
| 61-108821 | 5/1986 | Japan . |
| 632013 | 1/1950 | United Kingdom . |
| 1012463 | 12/1965 | United Kingdom . |
| 2120318 | 11/1983 | United Kingdom . |

*Primary Examiner*—Benjamin R. Fuller
*Attorney, Agent, or Firm*—Anthony J. Casella; Gerald E. Hespos

[57] ABSTRACT

A muffler is provided with a pair of stamp formed internal plates and a pair of stamp formed external shells. The internal plates define inlet and outlet tubes at least portions of which are provided with arrays of perforations or louvers. One or more tuning tubes may be stamp formed in the internal plates and one or more low frequency resonator chambers may be stamp formed from portions of either the internal plates or the external shells. The external shells may further be configured to define high frequency tuning chambers of a selected size and shape.

25 Claims, 6 Drawing Sheets

STAMP FORMED MUFFLER

Matter enclosed in heavy brackets [ ] appears in the original patent but forms no part of this reissue specification; matter printed in italics indicates the additions made by reissue.

BACKGROUND OF THE INVENTION

Prior art vehicular exhaust mufflers typically comprise a tubular outer shell defining an oval or circular cross section and a pair of opposed heads mechanically connected to the shell. The shell generally is formed from one or more sheets of metal that are wrapped into the tubular configuration, and are secured in the required shape by a longitudinally extending seam. An inlet and an outlet extend into the opposed heads of the muffler and connect to tubes disposed within the muffler.

The internal configurations of the prior art mufflers have been quite varied and have been determined by both the available space on the vehicle and the particular characteristics of the sound produced by the exhaust gases of a specific engine. The typical prior art muffler includes a circuitous array of tubes extending between and connected to the inlet and the outlet. These respective tubes may communicate with one or more expansion chambers defined by at least one baffle within the muffler. The communication with the expansion tuning chambers typically is provided through the tubes.

In many situations at least one well defined range of noise will persist despite a properly engineered array of tubes and louvers. These residual noise patterns often are attenuated by tuning tubes extending into a closed resonating chamber. The size of the tuning tubes and resonating chambers will be selected in accordance with the frequency of the noise to be attenuated. The resonating chamber of the prior art muffler typically has required at least one additional tube and usually one or more additional baffles to be incorporated into an already complex structure.

The above described typical prior art muffler includes a large number of components that must be assembled in a labor intensive manufacturing process. Specifically, most prior art muffles require a multilayer outer shell, a pair of heads or end caps, at least two internal tubes and at least two internal baffles. Furthermore, most prior art mufflers will require separate structural elements for expansion chambers, high frequency tuning chambers and/or low frequency resonating chambers. The internal components of the muffler generally are assembled in a very labor intensive process. The various assembled internal components then are inserted into the tubular shell of the muffler which was previously formed from one or more sheets of metal. The opposed muffler head then are mechanically positioned relative to the shell and are securely mounted thereto.

Attempts have been made to develop stamp formed mufflers in an effort to minimize the number of parts required for the muffler and to reduce the number of manual assembly steps. The logic has been that the stamp forming dies could be configured to define a circuitous route through which the exhaust gases travel. An appropriately circuitous exhaust gas flow pattern could effectively reduce noise.

Several prior art mufflers have merely employed a stamp formed outer shell in combination with a plurality of separate internal members substantially identical to the internal members in the standard muffler having a wrapped outer shell. Examples of mufflers with a stamped outer shell and separate internal baffles and tubes are shown in U.S. Pat. No. 2,943,695 which issued to Jeffords on July 5, 1960, U.S. Pat. No. 3,158,222 which issued to Richmond on Nov. 24, 1964 and U.S. Pat. No. 3,220,508 which issued to Nordquest et al on Nov. 30, 1965.

Other prior art mufflers have employed two stamp formed members configured to define a circuitous air flow pattern without resorting to separate internal tubes and baffles. Examples of such structures are shown in U.S. Pat. No. 2,860,722 which issued to Gerstung on Nov. 18, 1958, U.S. Pat. No. 3,176,791 which issued to Betts et al on Apr. 6, 1965, U.S. Pat. No. 3,638,756 which issued to Thiele on Feb. 1, 1972 and U.S. Pat. No. 4,108,274 which issued to Snyder on Aug. 22, 1978. In the above cited U.S. Pat. No. 3,638,756, two opposed stamp formed members were appropriately configured to define not only a circuitous air flow pattern, but also to define low frequency tuning chambers.

Still other prior art mufflers have employed more than two stamp formed members to define an acceptable flow path for exhaust gases through the muffler. For example, U.S. Pat. No. 3,140,755 which issued to Tranel on July 14, 1964, shows two inner stamp formed members configured to define the exhaust gas flow path and two outer stamp formed members configured to define a continuous enclosure around the path defined by the inner members. U.S. Pat. No. 4,396,090 which issued to Wolfhugel on Aug. 2, 1984 shows a muffler wherein the exhaust gas flow passages are formed by stamp forming, while the outer shell is formed from sheet metal wrapped around the stamp formed components.

U.S. Pat. No. 4,456,091 issued to Blanchot on Jun. 26, 1984 and shows a muffler having more than four stamp formed members. More particularly, two internal members are stamp formed to have longitudinally extending corrugations which when placed in face to face relationship, define a tubular array. Two outer stamp formed members then are configured to define a generally continuous outer enclosure. Separate stamp formed support members are disposed between the outer stamp formed members and the inner stamp formed members to contribute to a proper spaced relationship therebetween. Certain of the corrugated portions of the inner stamp formed members are perforated to provide gas communication between the array of tubes and the enclosure defined by the continuous outer shell. Although this reference relies exclusively on stamp formed members, there are a relatively large number of members that would contribute both to the costs of the product and the assembly time. Similar structures are shown in British Pat. No. 632,013 and British Pat. No. 1,012,463. In both of these British patents, two inner plates are stamp formed to define perforated tubes when mated with one another. Two additional members are stamp formed to define a continuous outer shell which surrounds and is spaced from the perforated tubes. In each of these British patents, either the inner plate members or the outer plate members are formed to define baffles which enable the creation of expansion chambers.

The above described stamp formed mufflers could provide certain cost advantages over conventional mufflers for large production runs. These cost advantages would be attributable to the substantially smaller number of internal components for the muffler, lower labor costs and good material yield. Despite this apparent cost advantage, the prior art stamp formed mufflers have not received significant commercial success, even for the original equipment mufflers which are manufactured in production runs that are large enough to justify the initial tooling costs. One reason for this lack of commercial acceptance has been that the incorporation of resonating chambers into the stamp formed muffler using prior art techniques would require separate components and would add to labor needs, thereby substantially increasing costs of the stamped formed muffler. Low frequency resonating chambers, however, are often required to meet the noise standards of new car manufacturers. Furthermore, the prior art stamp formed mufflers have not provided for both low frequency and high frequency tuning chambers, which often are required to meet selected noise reductions.

In addition to the above described drawbacks, it has been realized that mufflers in general do not account for the fact that exhaust gases cool as they pass through the muffler and therefore acquire different flow and volume characteristics. Furthermore, it has been realized that mufflers in general are not well suited to the specific space availability in or adjacent to the vehicle. Thus, mufflers often are merely added to the bottom of the car thereby adversely affecting both the aesthetics of the vehicle and the air flow profile. Additionally, it has been more costly to manufacture a prior art muffler with more than one inlet and/or more than one outlet or with more than one low frequency resonating chamber because of the additional connections that must be made within the available space.

In view of the above, it is an object of the subject invention to provide an efficient stamp formed muffler.

It is another object of the subject invention to provide a stamp formed muffler with efficient high frequency tuning chambers and/or low frequency resonating chambers.

Another object of the subject invention is to provide a stamp formed muffler having more than one inlet and/or more than one outlet.

A further object of the subject invention is to provide a stamp formed muffler wherein the internal tubes are dimensioned to reflect the temperature and volume changes of the exhaust gases passing therethrough.

SUMMARY OF THE INVENTION

The subject invention is directed to an exhaust muffler formed entirely from stamp formed members. The muffler is configured to conform to an available space envelope on the vehicle. As a result, the muffler may be of irregular external configuration to reflect the specific configuration of the available space on the vehicle.

The muffler may comprise a pair of stamp formed inner plates which are placed in register with one another to define at least one inlet tube and at least one outlet tube. The internal plates may further comprise at least one tuning tube leading to one or more low frequency resonating chambers. In certain embodiments, the pair of stamp formed internal plates may further define the walls of the resonating chambers and/or a return tube between the inlet and outlet tubes. Certain of the tubes defined by at least one of the stamp formed internal plates may be perforated or louvered to provide appropriate sound attenuating effects, as explained in detail below.

The stamp forming of the internal plates may be carried out to define a major diameter for the one or more inlet tubes and a minor diameter for the one or more outlet tubes. The differences in the diameters of the inlet and outlet tubes may be selected to reflect the volume changes that occur as the exhaust gases gradually cool in passing through the muffler. More particularly, these dimensional changes enable the exhaust gas pressure and exhaust gas velocity to be carefully controlled throughout the muffler.

In one embodiment, the internal plates may be stamp formed from a single sheet of metal with a hinge line between the opposed halves. The halves may then be folded onto one another to define the gas flow channels and in certain embodiments the low frequency resonating chambers. This embodiment enables the internal components of the muffler to be formed from a single sheet of metal.

The muffler of the subject invention may further comprise a pair of stamp formed external shells which are dimensioned to be placed in register with one another and to surround and enclose the stamp formed internal plates. The stamp formed external shells are appropriately configured to define one or more inlets and one or more outlets which correspond in number and location to the inlets and outlets defined by the internal plates. Thus, the inlets and outlets of the external shell will surround and engage the inlets and outlets defined by the stamp formed internal plates.

The stamp formed external shell may further define at least one high frequency tuning chamber for contributing to the attenuation of the noise produced by the exhaust gases. More particularly, the tuning chamber defined by the stamp formed exteral shell is disposed to be in line with the perforated or louvered portions of the inlet tube, outlet tube or return tube defined by the stamp formed internal plates. The tuning chamber preferably is dimensioned to reflect the ranges of frequency of noise which will be attenuated by the muffler. In certain embodiments, the stamp formed external shell will be configured to form a plurality of tuning chambers of different dimensions, such that exhaust gas noises over a range of frequencies may be attenuated. The outer shells may also be stamp formed from a single sheet of metal with a hinge line enabling opposed halves to be folded into registration with one another.

The stamp formed external shell may further be dimensioned to at least partly define one or more low frequency resonating chambers for the muffler. In these instances, the stamp formed internal plate will be configured to define a tuning tube leading into a low frequency resonating chamber defined by the stamp formed external shell. In certain embodiments a continuous nonperforated tube formed by the internal stamp formed plates may extend entirely through a low frequency resonating chamber defined by the stamp formed external shell. In these embodiments, the tube extending through the low frequency resonating chamber will communicate either with the inlet or outlet of the muffler or with a selected tuning chamber in the muffler.

The stamp formed external shells preferably are provided with peripheral flanges which are dimensioned to mate with one another and to substantially surround the internal stamp formed plates. The peripheral flanges may be appropriately connected to one another by welding or by a mechanical interconnection.

DETAILED DESCRIPTION OF THE PREFERRED EMBODIMENT

Figure 1:
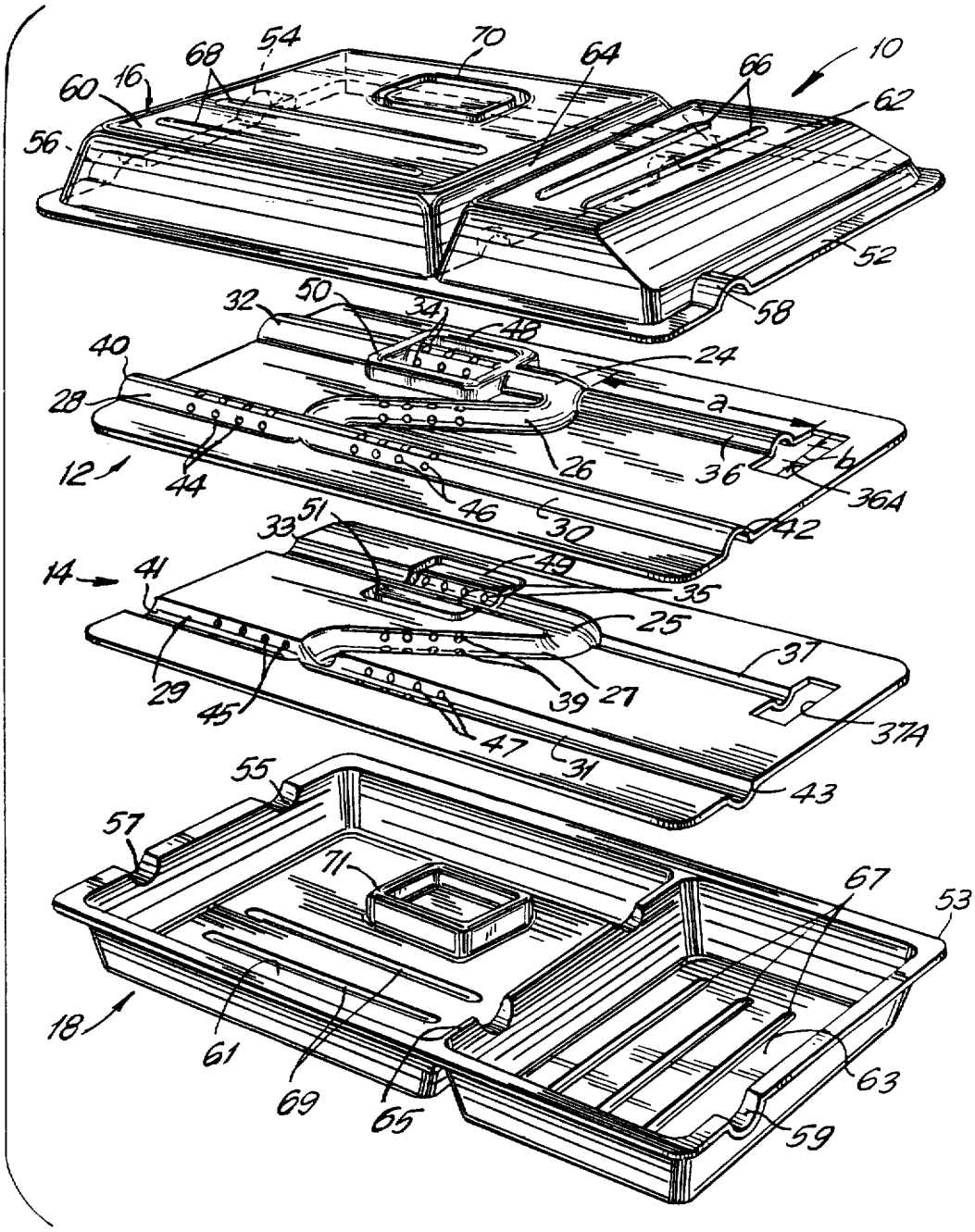
FIG. 1 is an exploded perspective view of the muffler of the subject invention.
Figure 2:
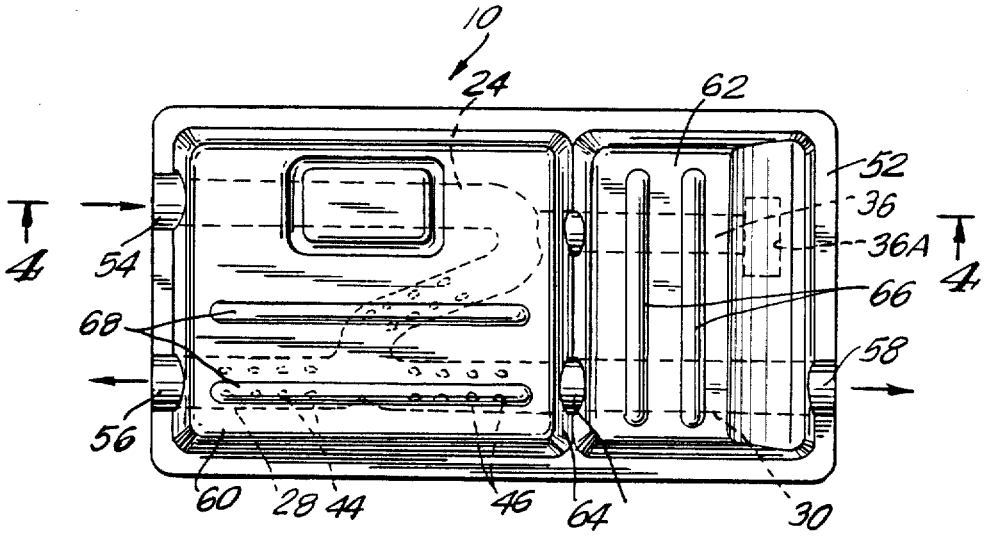
FIG. 2 is a top plan view of the muffler shown in FIG. 1.
Figure 3:
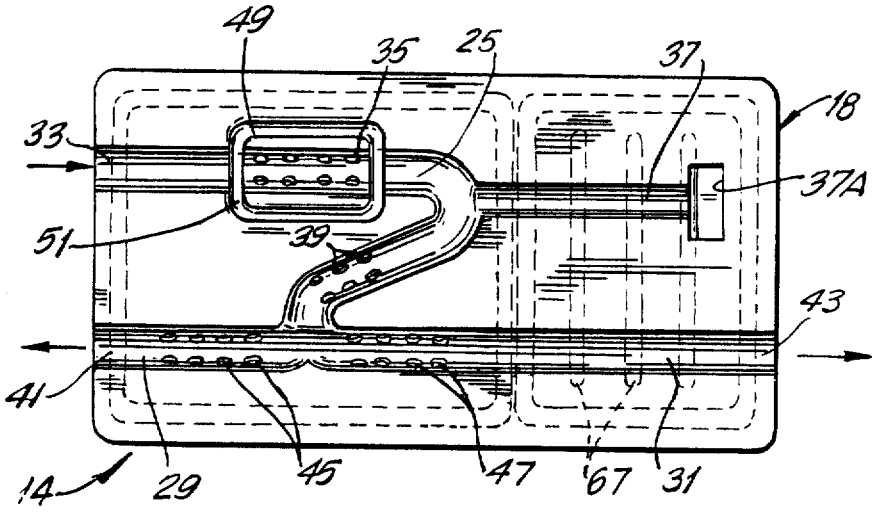
FIG. 3 is a top plan view of two assembled plates for incorporation into the muffler shown in FIG. 2.

The muffler of the subject invention is indicated generally by the numeral 10 in FIGS. 1–3. As shown most clearly in FIG. 1, the muffler 10 comprises a pair of stamp formed internal plates 12 and 14 and a pair of stamp formed external plates 16 and 18. The internal plates 12 and 14 are dimensioned and formed to be placed substantially in register with one another and to define an array of tubes for the exhaust gases traveling through muffler 10, as explained in detail below. The external shells 16 and 18 are dimensioned and stamp formed to be placed in register with one another and to substantially surround the internal plates 12 and 14 and to define high frequency tuning chambers and low frequency resonating chambers as explained below. The volumes of the tuning and resonating chambers will be determined by the acoustical characteristics of the engine exhaust gases. However, the specific configuration of the external shells 16 and 18 will be determined by the configuration of the space envelope on the vehicle.

The internal plate 12 is stamp formed to define an inlet channel 24, a return channel 26 in communication with the inlet channel 24 and outlet channels 28 and 30 each of which is in communication with the return channel 26. The inlet channel 24 terminates at an inlet end 32 which, on the assembled muffler 10, will be placed in communication with the exhaust pipe of the vehicle. The inlet channel 24 further comprises an array of apertures 34 which will enable communication to a high frequency tuning chamber, as explained further below.

The inlet channel 24 and the return channel 26 join at an angle to enable a substantial reversal of the exhaust gases flowing through the muffler 10. A tuning channel 36 communicates with both the inlet channel 24 and the return channel 26 substantially at their intersection. The tuning channel 36 terminates at an aperture 36A in the inner plate 12. The length "a" and width "b" of the tuning channel 36 will be a function of the noise characteristics of the engine with which the muffler 10 is employed. As explained further below, the tuning channel 36 through aperture 36A will be in communication with a low frequency resonating chamber of the muffler 10.

The return channel 26 is provided with an array of perforations 38 which enable communication to an expansion chamber as explained below. The return channel 26 joins with outlet channels 28 and 30. The sides of the outlet channels 28 and 30 opposite the return channel 26 may be appropriately dimensioned and configured to split the exhaust gases between the two outlet channels 28 and 30. The outlet channel 28 extends from return channel 26 to outlet end 40 which will be placed in communication with a tail pipe of the vehicle on which muffler 10 is mounted. Similarly, the outlet channel 30 extends from the return channel 26 to outlet end 42 which also will be placed in communication with a second tail pipe on the vehicle. Outlet channels 28 and 30 are provided with arrays of perforations 44 and 46 respectively which enable communication between the exhaust gases and an expansion chamber as explained below.

The inlet end 32 has a width greater than the width of the outlet ends 40 and 42. Furthermore, the return channel 26 has a width greater than the width of outlet ends 40 and 42. This decrease in width between inlet end 32 and outlet ends 40 and 42 may be gradual or stepped at selected locations. The changes in width reflect the fact that the exhaust gases cool and contract as the pass through the muffler 10. Additionally, the decreases in width assure a proper division of exhaust gases from the return channel 26 to the outlet channels 28 and 30.

The internal plate 12 is stamp formed to define channels 48 and 50 each of which extends from the plane of the internal plate 12 in the same direction as the inlet channel 24. The channels 48 and 50 each intersect the inlet channel 24 in two locations disposed respectively on opposite sides of the inlet channel 24 and at opposite ends of the array of perforations 34. The channels 48 and 50 will partly define a high frequency tuning chamber which will surround the array of perforations 34 in the inlet tube defined in part by the inlet channel 24.

The internal plate 14 is depicted as a virtual mirror image of the internal plate 12, however variations are possible as explained herein. More particularly, the internal plate 14 comprises an inlet channel 24, a return channel 27 and outlet channels 29 and 31. The inlet channel 25 includes an inlet end 33 which will be placed in communication with the exhaust pipe on the vehicle on which muffler 10 is mounted. The inlet channel 25 further includes an array of perforations 35 which will be substantially in register with the perforations 34 on internal plate 12. A tuning channel 37 communicates with the inlet channel 25 and the return channel 27 at their juncture. The opposed end of the tuning channel 37 terminates at aperture 37A. The tuning channel 37 and the aperture 37A will be in register with the tuning channel 36 and aperture 36A on internal plate 12 to define a tuning tube on the assembled muffler 10. The diameter and length of the tuning tube formed by the tuning channels 36 and 37 is selected in accordance with the frequency of the sound to be attenuated.

The return channel 27 includes perforations 39 which will communicate with an expansion chamber as explained below. The outlet channels 29 and 31 terminate at outlet ends 41 and 43 respectively. Additionally, the outlet channels 29 and 31 are provided with arrays of perforations 45 and 47 which will communicate with an expansion chamber on muffler 10.

Internal plate 14 further includes channels 49 and 51 which extend into the plane of internal plate 14 in the same direction as the inlet channel 25. The channels 49 and 51 are dimensioned to lie substantially in register with the channels 48 and 50 of internal plate 12. Thus, the channels 49 and 51 each intersect inlet channel 25 in two locations disposed respectively at opposite ends of the array of perforations 35.

The external shell 16 includes a peripheral flange 52 which is depicted as lying generally in a single plane and defines an external dimension equal to or greater than the external dimension of internal plates 12 and 14. The peripheral flange 52 is arcuately formed at locations 54, 56 and 58 to closely engage the inlet channel 24 and the outlet channels 28 and 30 respectively of the internal plate 12. It will be appreciated that in other embodiments, the peripheral flange may be non-planar.

The external shell 16 is stamp formed to define an expansion chamber shell 60 and a low frequency resonating chamber shell 62 which are separated from one another by a crease 64. More particularly, the expansion chamber shell 60 is defined by the crease 64 on one side and by the peripheral flange 52 on its remaining sides. Similarly, the low frequency resonating chamber shell 62 is defined by the crease 64 on one side and by the peripheral flange 52 on its remaining sides. The low frequency resonating chamber shell 62 is disposed to be in communication with the end of the tuning channel 36 and the aperture 36A adjacent thereto. The exact dimension of the low frequency resonating chamber shell 62 are selected in accordance with the frequency of the particular sound to be attenuated and by the dimensions of the tuning tube formed from tuning channels 36 and 37 in the internal plates 12 and 14. The low frequency resonating chamber shell 62 is further characterized by reinforcing ribs 66 which contribute to the strength of the muffler 10 and which are dimensioned to prevent noise generating vibrations.

The expansion chamber shell 60 is dimensioned to substantially enclose the arrays of apertures 38, 44 and 46 in the return channel 26 and the outlet channels 28 and 30 respectively. The expansion chamber shell 60 similarly is provided with reinforcing ribs 68.

The external shell 16 is provided with an inwardly directed continuous channel 70 within the area of the expansion chamber shell 60. The channel 70 is dimensioned to be substantially in register with the channels 48 and 50 of the internal plate 12. Furthermore, the channel 70 will be of a depth sufficient to enable secure mechanical interconnection with channels 48 and 50 of internal plate 12, thereby defining an enclosed high frequency tuning chamber surrounding perforations 34 but disposed within the expansion chamber shell 60.

The external shell 18 is not necessarily a mirror image of the external shell 16. Rather, the respective shapes of the external shells 16 and 18 will reflect the size and shape of the space envelope on the vehicle. More particularly, the external shell 18 includes a peripheral flange 53 extending entirely thereabout. The peripheral flange is provided with arcuately formed portions 55, 57 and 59 which are dimensioned to securely engage the respective inlet channel 25 and outlet channels 29 and 31. The external shell 18 is further characterized by an expansion chamber shell 61 and a low frequency resonating chamber shell 63 which are separated from one another by a crease 65. More particularly, the expansion chamber shell 61 and the low frequency resonating chamber shell 63 are dimensioned to be in register with the expansion chamber shell 60 and the low frequency resonating chamber shell 62 on the external plate 16. The external shell 18 is further provided with reinforcing ribs 67 and 69 which are dimensioned to prevent noise generating vibrations as explained above. The external shell 18 if further provided with a continuous inwardly directed channel 71 which is dimensioned to engage the channel 49 and 51 of internal plate 14 to define a high frequency tuning chamber, as explained above.

Figure 4:
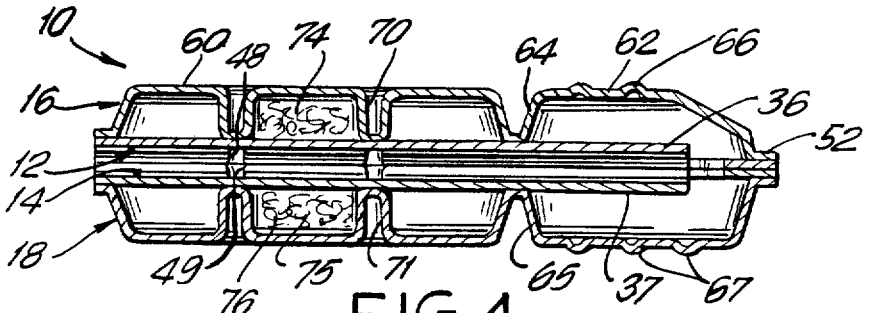
FIG. 4 is a cross-sectional view taken along line 4—4 in FIG. 2.

The muffler 10 is assembled by first joining the internal plates 12 and 14 at selected locations to achieve a secure connection and to prevent vibrations therebetween. The external shells 16 and 18 then are securely joined around the structure formed by internal plates 12 and 14. The resulting muffler 10, as shown in FIGS. 2–4 includes an inlet formed by the ends 32 and 33 of inlet channels 24 and 25 and a pair of outlets formed by ends 40–43 of the outlet channels 28–31 respectively. The inlet and the outlets are connectable to the exhaust pipe and tail pipes of a vehicle. The arrays of perforations 34 and 35 in the inlet channels 24 and 25 are surrounded by the high frequency tuning chambers 74 and 75 formed by the channels 48–51 in internal plates 12 and 14 and the channels 70 and 71 in the external shells 16 and 18. The high frequency tuning chambers 74 and 75 may be packed with insulation 76. The perforation arrays 38, 39 and 44–47 are enclosed within the expansion chamber shells 60 and 61. The muffler 10 further includes low frequency resonating chambers formed by the resonating chamber shells 62 and 63. The tuning tube formed by the tuning channels 36 and 37 provides communication into the low frequency resonating chambers formed by the shells 62 and 63 through apertures 36A and 37A. The volumes of the low frequency resonating chambers, as well as the dimensions of the tuning tube formed by channels 36 and 37 will be selected in accordance with the acoustical characteristics of the sounds to be attenuated.

Figure 5:
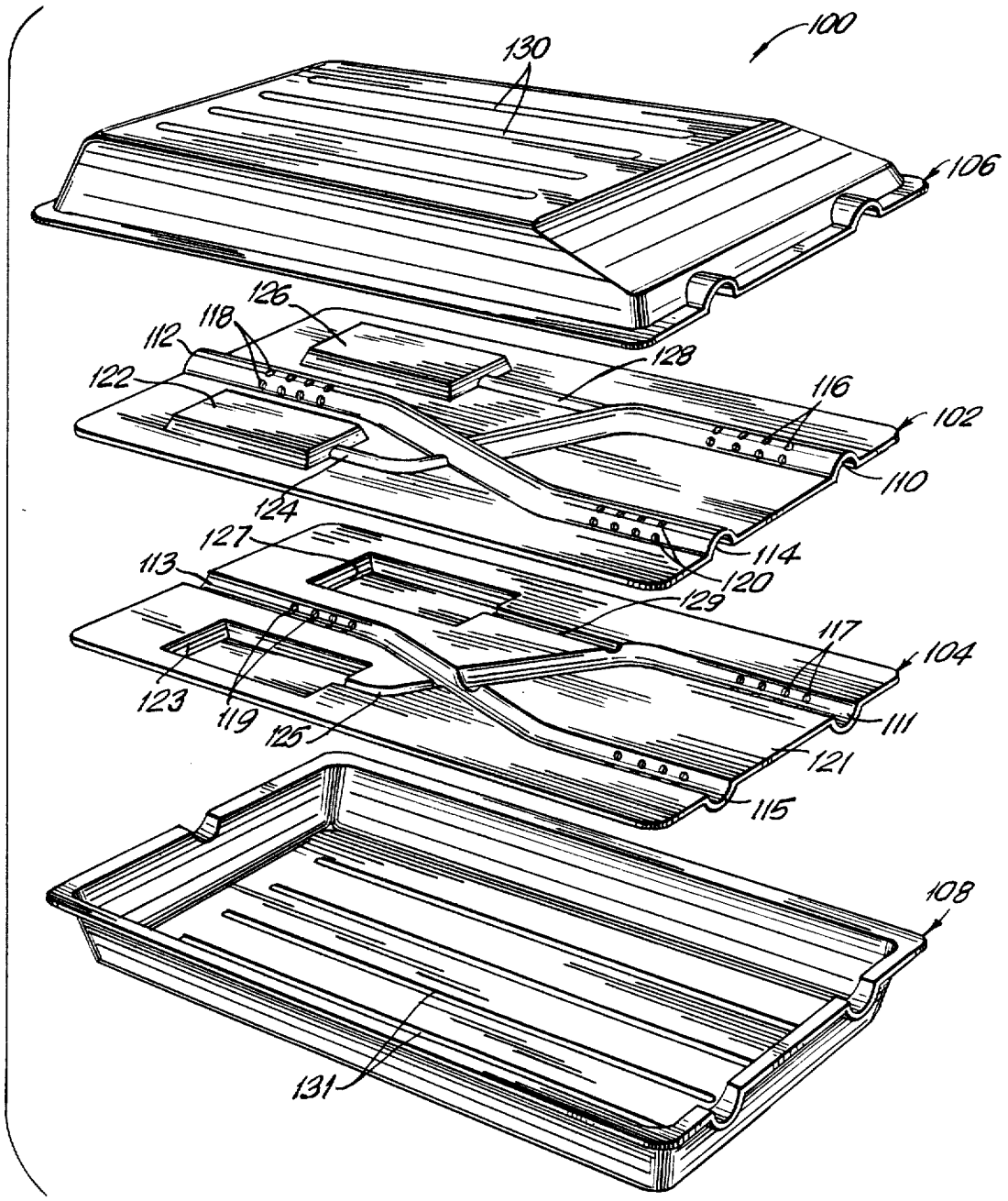
FIG. 5 is an exploded perspective view of an alternate embodiment of the muffler of the subject invention.

An alternate embodiment of the subject muffler is indicated generally by the numeral 100 in FIG. 5. The muffler 100 is formed by a pair of stamp formed internal plates 102 and 104 and a pair of stamp formed outer shells 106 and 108. The internal plates 102 and 104 include a pair of registrable inlet channels 110 and 111, a first pair of registrable outlet channels 112 and 113 and a second pair of registrable outlet channels 114 and 115. Preferably, the outlet channels 112–115 are of smaller dimension than the inlet channels 110 and 111 to insure a proper directional flow of exhaust gases to both registrable pairs of outlet channels and to account for the cooling and contraction of exhaust gases passing through the muffler 100. The inlet channels 110 and 111 are provided with arrays of perforations 116 and 117. Similarly, the outlet channels 112–115 are provided with arrays of perforations 118–121. The area encompassed by the perforations 116–121 is selected to achieve the desired cross bleeding and sound attenuation effects.

The internal plates 102 and 104 are further provided with a registrable pair of low frequency resonating chamber shells 122 and 123. The low frequency resonating chamber shells 122 and 123 are in communication with the outlet channels 112–115 by means of registrable tuning channels 124 and 125. Similarly, a second and larger resonating chamber shell 126 is formed in internal plate 102 for registration with the low frequency resonating chamber shell 127 in the internal plate 104. Tuning channel 128 provides communication between the inlet channel 110 and the low frequency resonating chamber shell 126. Similarly, tuning channel 129 is in registration with tuning channel 128 and provides communication between the lower frequency resonating chamber shell 127 and the inlet channel 117. The volumes defined by the low frequency resonating chamber shells 122 and 123 and the low frequency resonating chamber shells 126 and 127 and the dimensions of tuning chambers 124, 125 and 128, 129 are selected to properly attenuate selected frequencies.

The outer shells 106 and 108 are stamp formed to define a single enclosure that will surround the entire internal plates 102 and 104. Reinforcing ribs 130 and 131 are provided to prevent noise generating vibrations.

The muffler 100 is assembled by first joining the internal plates 102 and 104 to one another securely, and then joining the external shells 106 and 108 thereabout, as had been explained with respect to the embodiment of FIGS. 1–4.

Figure 6:
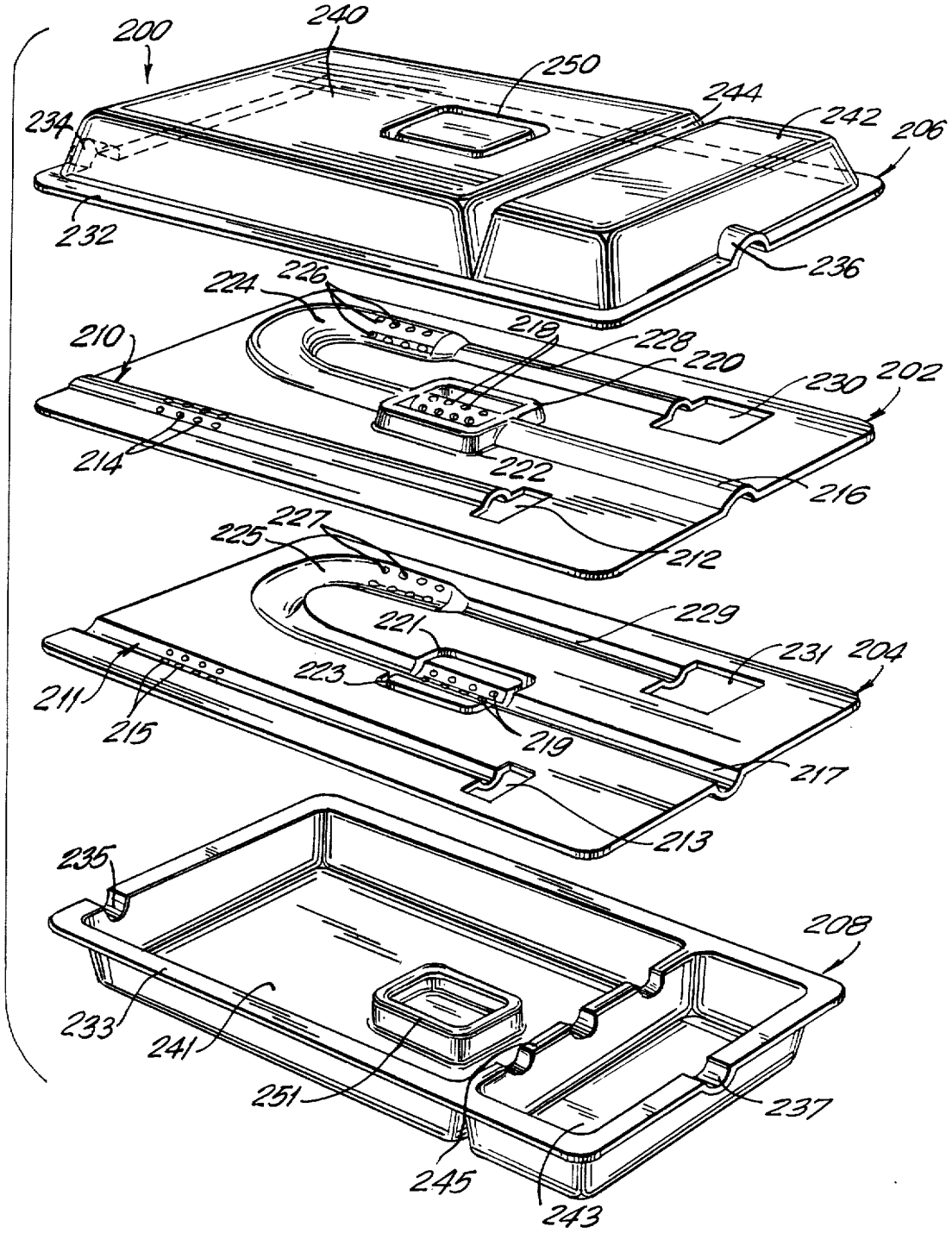
FIG. 6 is an exploded perspective view of a third embodiment of the muffler of the subject invention.
Figure 7:
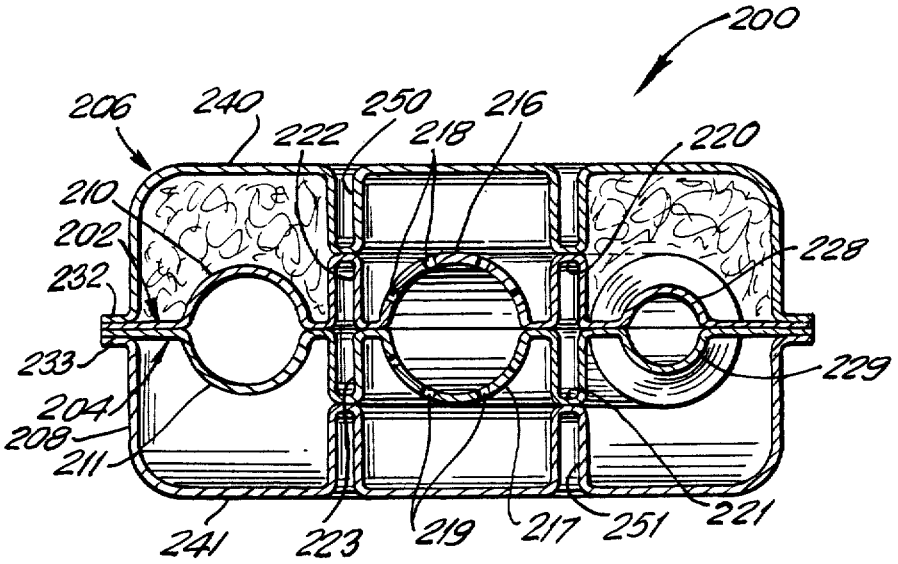
FIG. 7 is a cross-sectional view of the assembled muffler shown in FIG. 6.

A third embodiment of the stamp formed muffler of the subject invention is indicated generally by the numeral 200 in FIGS. 6 and 7. The muffler 200 includes stamp formed internal plates 202 and 204 and stamp formed external plates 206 and 208. The internal plates 202 and 204 are stamp formed to define inlet channels 210 and 211 which terminate at apertures 212 and 213 therein. The inlet channels 210 and 211 are provided with arrays of perforations 214 and 215 respectively.

The internal plates 202 and 204 further include outlet channels 216 and 217 which are provided respectively with arrays of perforations 218 and 219. Channels 210 and 222 are stamp formed in the internal plate 202 to intersect the outlet channel 216 in two locations on opposite ends of the array of perforations 218. Similarly, the internal plate 204 is provided with channels 221 and 223 which intersect with the outlet channel 217 at two locations disposed on opposite ends of the array of perforations 219. As had been explained with the embodiment shown in FIGS. 1–4, the channels 220–223 will contribute to the definition of a high frequency tuning chamber surrounding the perforated portion of outlet channels 216 and 217.

The internal plate 202 is further stamp formed to define a return channel 224 having an array of perforations 226 therein. The return channel 224 is in communication with the outlet channel 216. The opposite end of the return channel 224 is in communication with a tuning channel 228 stamp formed in the internal plate 202. The tuning channel 228 terminates at an aperture 230. The tuning channel 228 is illustrated as being of smaller dimension than the return channel 224. The actual width and length of the tuning channel 228 and the dimension of the aperture 230 will be selected in accordance with the noise characteristics of the vehicle upon which the muffler 200 is mounted. In a similar manner, the internal plate 204 is provided with a return channel 225 having perforations 227 formed therein. The return channel 225 communicates with the outlet channel 217 and with tuning channel 229. The tuning channel 229 terminates at the aperture 231. The internal plates 202 and 204 are stamp formed to be mirror images of one another as explained with the previous embodiments.

The external shells 206 and 208 are stamp formed to define generally planar peripheral flanges 232 and 231 respectively. The peripheral flange 232 is characterized by arcuately formed portions 234 and 236 dimensioned to engage the inlet and outlet channels 210 and 216 respectively. Similarly, the peripheral flange 233 on external shell 208 is provided with arcuately formed portions 235 and 237 which are dimensioned to securely engage inlet and outlet channels 211 and 217 on the internal plate 204. The external shell 206 is stamp formed to define an expansion chamber shell 240 and a low frequency resonating chamber shell 242 which are separated from one another by a crease 244 therein. Similarly, the external shell 208 is stamp formed to include an expansion chamber shell 241 and a low frequency resonating chamber shell 243 which are separated from one another by a crease 245. The low frequency resonating chamber shells 242 and 243 are dimensioned to provide communication with the apertures 212, 213, 230 and 231 in the internal plates 202 and 204.

The external shell 206 is stamp formed to define a continuous inwardly directed channel 250 dimensioned to engage the channels 220 and 222 on internal plate 202 and thereby defining a high frequency tuning chamber around the array of perforations 218. Similarly, the external shell 208 is provided with a continuous inwardly directed channel 251 dimensioned to engage with the channels 221 and 223 to define a high frequency tuning chamber around the array of perforations 219.

The muffler 200 shown in FIGS. 6 and 7 is assembled by joining the internal plates 202 and 204 together at selected locations, and then joining the external shells 206 and 208 around the structure formed from the internal plates 202 and 204. An insulating material 260 may be disposed in at least one half of the expansion chamber, as shown. The resulting muffler 200 will have several unusual characteristics. First, the primary flow of exhaust gases entering the expansion chamber will be through the arrays of perforations 214 and 215 in the inlet channels 210 and 211. These exhaust gases will circulate through the expansion chamber defined by expansion chamber shells 240 and 241 and then into the apertures 226 and 227 of the return tube formed by channels 225 and 225. The gases will continue to flow through the outlet formed by channels 216 and 217. In traveling to the outlet, the exhaust gases will travel through the high frequency tuning chambers defined by channels 250, 251 and 220–223.

The portion of the inlet between perforation arrays 214, 215 and the apertures 212, 213 will function as a tuning tube. Similarly, the stamp formed channels 228 and 229 leading to the apertures 230 and 231 will function as a tuning tube. Thus, the stamp formed configuration of muffler 200 enables the unusual but effective construction of two tuning tubes leading into a single low frequency resonating chamber. Because of this unusual structure, there is also provided a minor gas flow between the inlet formed by channels 210, 211 and the tuning tube formed by channels 228 and 229.

Figure 8:
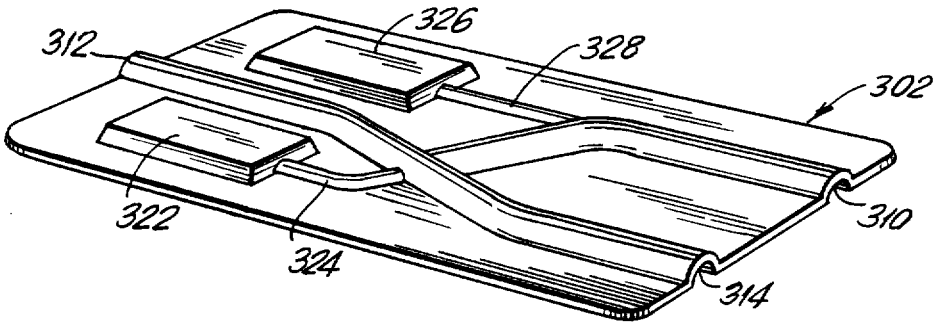
FIG. 8 is a perspective view of a plate for use in a muffler similar to the muffler of FIG. 5.

In certain situations, it may be possible to provide a stamp formed muffler with fewer than the four components described in the previous embodiments. Specifically, FIG. 8 shows a stamp formed plate 302 that can be used in place of the internal plate 102 on the muffler 100 shown in FIG. 5. The stamp formed plate 302 can be employed with the internal plate 104 and the external shell 108 shown in FIG. 5, and obviates the need to employ a second external shell 106. More particularly, the plate 302 is stamp formed to define an inlet channel 310 and a pair of outlet channels 312 and 314. However, unlike the inlet and outlet channels of the internal plate 102 described above, neither the inlet channel 310 nor the outlet channels 312 and 314 are provided with perforations. Thus, the stamp formed plate 302 will function as an external plate on the muffler in which it is incorporated. In this embodiment, a single expansion chamber will be disposed between the internal plate 104 and the external shell 108 depicted in FIG. 5.

The stamp formed plate 302 is further provided with a low frequency resonating chamber shell 322 which communicates with the inlet channel 310 through the tuning channel 324. Similarly, a second and differently dimensioned low frequency resonating chamber shell 326 is provided and communicates with the inlet channel 310 through the tuning channel 328. As with the previously described embodiments, the dimensions of the tuning channels 324 and 328 and the low frequency resonating chamber shells 322 and 326 are selected in accordance with the frequencies of the sounds to be attenuated.

It should be noted that the stamp formed channels 310–314, 324 and 328 and the stamp formed low frequency resonating chamber shells 322 and 326 are depicted to be in register with the corresponding stamp formed members of the internal plate 104 shown in FIG. 5. Additionally, the stamp formed portions of internal plate 104 and plate 302 are depicted as being generally mirror images of one another. However, this mirror image configuration is not at all essential, and, as explained previously, the shape of the various stamp formed members would be largely determined by the configuration of the space envelope available on the vehicle. It should also be noted that although the tubes defined by the stamp forming are depicted as being generally circular, any geometric cross-sectional configuration is possible. Thus, the internal plate 104 could be secured between the external shell 108 and a single flat plate with no perforations. In this embodiment, the single flat plate could be disposed on the lower side of the vehicle to provide an aerodynamically efficient profile. The external shell 108 would thus be provided on the upper side and could be configured to conform to the available space envelope on the vehicle.

Figure 9:
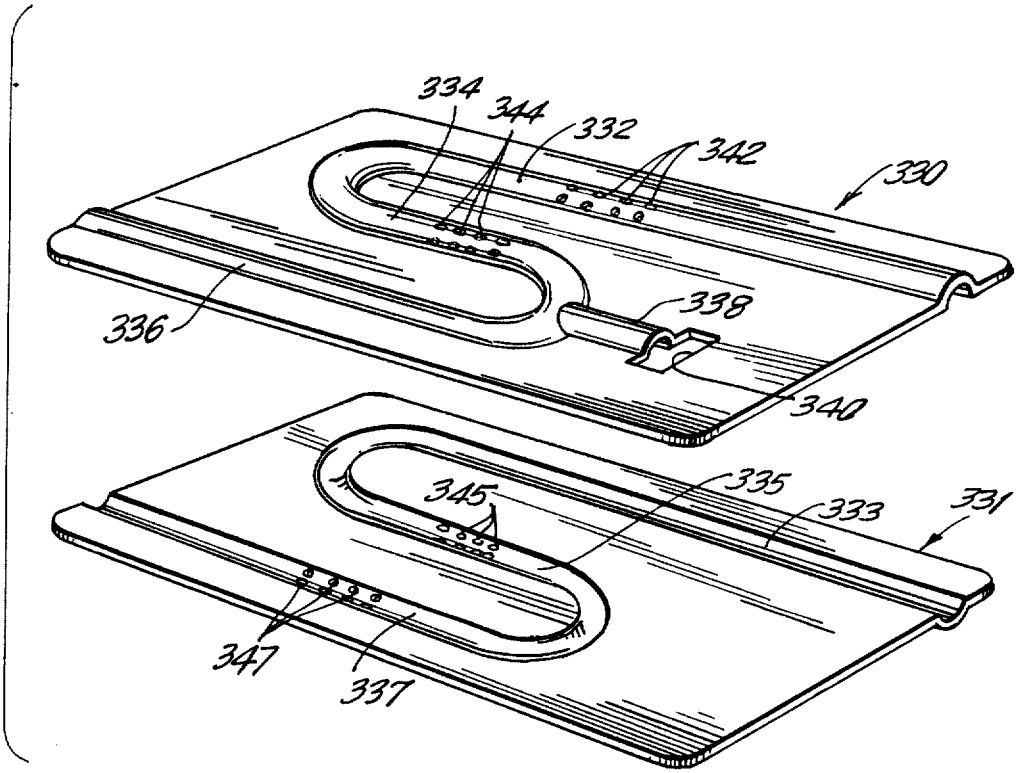
FIG. 9 is an exploded perspective view of two internal plates for use with the muffler of the subject invention.

FIG. 9 shows a pair of internal plates 330 and 331 which may be used with any of a variety of external shells as explained further below. More particularly, the internal plate 330 is stamp formed to include an inlet channel 332, a return channel 334 in communication with the inlet channel 332 and an outlet channel 336 in communication with the return channel 334. A tuning channel 338 is stamp formed to communicate with the return channel 334 and the outlet channel 336 approximately at their juncture. A tuning aperture 340 is stamp formed at the end of the tuning channel 338 to enable communication with a low frequency resonating chamber as explained further below. As noted above, the length and cross-sectional area of the tuning channel 338 is selected in accordance with the frequencies of the low frequency sounds to be attenuated thereby. The inlet channel 332 is provided with an array of perforations therein. Similarly, the return channel 334 is provided with an array of perforations 344 therein.

The internal plate 331 is dimensioned and stamp formed to mate with the internal plate 330. More particularly, the internal plate 331 is provided with an inlet channel 333, a return channel 335 and an outlet channel 337 which are consecutively in communication with one another and are disposed to be in register with the corresponding channels in the internal plate 330. The inlet channel 333 is not provided with perforations therein. However, the return channel 335 is provided with an array of perforations 345. Similarly, the outlet channel 337 is provided with an array of perforations 347. It should be noted that the internal plate 331 has no tuning channel comparable to the tuning channel 338 on internal plate 330.

The internal plates 330 and 331 would be employed with noticeably dissimilar external shells. More particularly, the external shell secured to the internal plate 330 would be provided with a crease to define a low frequency resonating chamber and an expansion chamber. The crease would be disposed such that the low frequency resonating chamber communicated with the tuning channel 338, while the expansion chamber communicated with the perforations 342 and 344. The crease defining these respective chambers would not necessarily have to be laterally extending as shown in the embodiments of FIGS. 1 and 6. Similarly, the external shell would not necessarily have to have its periphery in register with the periphery of the internal plate 330. The external shell secured to the internal plate 331 would merely need to define a single expansion chamber in communication with the perforations 345 and 347. Again, the periphery of the external shell secured to internal plate 331 would not have to be in register with the periphery of the internal plate 331.

The exhaust gas flow enabled by the internal plates 330 and 331 would be efficient and particularly unique. Specifically, exhaust gases could follow a first path along the circuitous, generally "S" shaped path defined by the inlet channels 332, 333, the return channels 334, 335 and the outlet channels 336, 337. Additionally, the exhaust gases could follow a second path by flowing through the perforations 342 into an appropriately dimensioned and configured expansion chamber and back through the perforations 344 to enter the return tube formed by the return channels 334 and 335. Similarly, the exhaust gases could then flow through the perforations 345 into an appropriately dimensioned and configured expansion chamber and back through the perforations 347 into the outlet tube formed by outlet channels 336 and 337. Thus, the exhaust gases would be following two "S" shaped paths disposed at approximately 90° to one another. Additionally, the muffler into which the internal plates 330 and 331 are disposed would provide for the tuning of selected low frequency sounds and could readily be configured to conform to any of a variety of different available space envelopes on a vehicle.

In summary, a stamp formed muffler is provided with a pair of stamp formed internal plates and a pair of stamp formed external plates. The stamp forming of the internal plates is selected to define at least one inlet and at least one outlet, portions of which are perforated. Additionally, the stamp forming of the internal plates may define at least one tuning tube. The internal plates and/or the external shells may be stamp formed to define a low frequency resonating chamber in communication with a tuning tube formed by the internal plates. The internal plates and the external shells may further be stamp formed to define one or more high frequency tuning chambers which may be disposed within a larger expansion chamber.

While the invention has been described with respect to certain preferred embodiments, it is apparent that various changes can be made without departing from the scope of the invention as defined by the appended claims.

What is claimed is:

1. A muffler for mounting to at least one exhaust pipe and at least one tail pipe of a vehicle, said muffler comprising a pair of plates securely connected to each other in generally face to face *abutting* relationship, each of said plates being stamp formed to define an array of channels therebetween, said channels being configured to define at least one inlet tube and at least one outlet tube in communication with one another and connectable to the exhaust pipe and tail pipe respectively, said inlet and outlet tubes each including at least one array of perforations extending therethrough, said arrays of channels further defining at least one tuning tube *of a selected length* in communication with at least one of said inlet and outlet tubes, *the length of the tuning tube extending along the abutting surfaces of the internal plates,* said muffler further comprising at least one stamp formed external shell securely mounted to said plates, said external shell being stamp formed to define: inlet and outlet openings surrounding and mounted to selected portions of said inlet and outlet tubes respectively, at least one chamber enclosing the arrays of perforations in said plates, and at least one stamp formed low frequency resonating chamber in communication with the tuning tube formed by the plates.

2. A muffler as in claim 1 wherein at least one of said inlet and outlet tubes stamp formed in said plates extends through said low frequency resonating chamber to at least one of said inlet and outlet openings defined by said external shells.

3. A muffler as in claim 1 wherein said external shells are stamp formed to define a plurality of chambers substantially surrounding the arrays of perforations in said plates, each of said chambers defining a volume different from the volume of each other of said chambers, whereby a larger one of said chambers defines an expansion chamber and whereby a smaller one of said chambers defines a high frequency tuning chamber.

4. A muffler as in claim 1 wherein said outlet tube is of smaller cross-sectional dimension than said inlet tube.

5. A muffler as in claim 1 wherein said plate is stamp formed to further define at least one return tube extending between said inlet and outlet tubes.

6. A muffler as in claim 5 wherein the return tube is of larger cross-sectional dimension than the outlet tube.

7. A muffler as in claim 5 comprising two outlet tubes in communication with said return tube, each of said outlet tubes being disposed at an angle of approximately 90° to said return tube.

8. A muffler as in claim 1 comprising two outlet tubes in communication with said inlet tube.

9. A muffler as in claim 1 comprising a pair of stamp formed external shells and wherein said at least one chamber comprises an expansion chamber and a high frequency tuning chamber disposed within the expansion chamber, said high frequency tuning chamber being defined by inwardly directed stamp formed channels in said external shells and outwardly directed stamp formed channels in said plates, said inwardly directed and outwardly directed channels being stamp formed to be in contact with one another and to substantially surround a selected array of perforations in said plates.

10. An exhaust muffler comprising:

a pair of stamp formed internal plates secured in face to face *abutting* relationship and defining an inlet tube having at least one array of perforations therein, an outlet tube having at least one array of perforations therein, a pair of generally registered apertures extending through said internal plates, and a tuning tube *having a selected length* extending from said outlet tube to said apertures, *the length of the tuning tube extending along the abutting surfaces of the internal plates*; and a pair of stamp formed external shells secured to and substantially surrounding said internal plates, said external shells being stamp formed to define a low frequency resonating chamber surrounding and in communication with said apertures in said internal plates and to define an expansion chamber surrounding the arrays of perforations in said inlet and outlet tubes.

11. A muffler as in claim 10 wherein said inlet tube extends into and communicates with said low frequency resonating chamber.

12. A muffler as in claim 10 wherein said outlet tube comprises a plurality of arrays of apertures, and wherein said external shells each include an inwardly extending channel surrounding one said array of perforations in said outlet tube, said channels being secured to said internal plates to define a high frequency tuning chamber.

13. A muffler as in claim 12 wherein said internal plates each include outwardly extending channels secured to the respective inwardly extending channels in said outer plates and defining portions of the high frequency tuning chamber.

14. A muffler comprising a pair of internal plates disposed in face to face *abutting* relationship, said internal plates being stamp formed to define at least one inlet tube, at least one outlet tube in communication with said inlet tube, a plurality of tuning tubes *having selected lengths* in communication with at least one of said inlet and outlet tubes and a corresponding plurality of substantially enclosed low frequency resonating chambers in communication respectively with each said tuning tube, *the length of each said tuning tube extending along the abutting surfaces of the internal plates,* said inlet and outlet tubes each comprising an array of perforations therein, said muffler further comprising a pair of external shells substantially surrounding said internal plates and secured thereto, said external shells being stamp formed to define at least one expansion chamber in communication with said perforations in said inlet and outlet tubes.

15. A muffler as in claim 14 wherein said external shells are stamp formed to define a plurality of reinforcing ribs therein.

16. A muffler for mounting to at least one exhaust pipe and at least one tail pipe of a vehicle, said muffler comprising:

a pair of internal plates securely connected to one another in generally face to face relationship, said internal plates being stamp formed to define first and second pairs of generally aligned apertures extending therethrough, the stamp formed internal plates further defining an inlet tube connectable to the exhaust pipe of the vehicle and extending to the first pair of apertures, said inlet tube further comprising at least one array of perforations therein, the stamp formed internal plates further comprising an outlet tube connectable to the tail pipe of the vehicle and having at least one array of perforations therein, and a tuning tube extending from the outlet tube to the second pair of apertures; and a pair of external shells secured to said internal plates, said external shells being stamp formed to define a low frequency resonating chamber surrounding said apertures in said internal plates and a high frequency tuning chamber surrounding the perforation arrays in said inlet and outlet tubes.

17. A muffler as in claim 16 wherein said outlet tube comprises a plurality of perforation arrays therein and wherein said external shells are stamp formed to define a plurality of high frequency tuning chambers, each said high frequency tuning chamber surrounding at least one array of perforations.

18. A muffler as in claim 17 wherein at least one external shell includes an inwardly extending channel secured to one said internal plate and surrounding an array of perforations in said outlet tube to define a high frequency tuning chamber.

19. A muffler as in claim 18 wherein at least one internal plate comprises at least one outwardly extending channel secured to the inwardly extending channel of said external shell and defining a portion of the high frequency tuning chamber.

20. A stamp formed muffler comprising:

first and second internal plates secured in generally face to face relationship and stamp formed to define an array of tubes therebetween, said array of tubes comprising an inlet tube, a return tube in communication with said inlet tube and an outlet tube in communication with said return tube, said first internal plate being characterized by arrays of perforations in the portions thereof defining the inlet and return tubes, said second internal plate including arrays of perforations extending through portions thereof defining the return and outlet tubes; and first and second stamp formed external shells secured respectively to said first and second stamp formed internal plates, said first external shell defining an expansion chamber enclosing and in communication with the perforations in the first internal plate, the second external shell being stamp formed to define an expansion chamber in communication with the perforations in said second internal plate.

21. A muffler as in claim 20 wherein said internal plates are stamp formed to define a tuning tube in communication with said array of tubes.

22. A muffler as in claim 21 wherein at least one of said external shells is stamp formed to define a low frequency resonating chamber in communication with said tuning tube.

*23. A muffler for mounting to at least one exhaust pipe and at least one tail pipe of a vehicle, said muffler comprising a pair of plates securely connected to each other in generally face to face abutting relationship, each of said plates being stamp formed to define an array of channels therebetween, said channels being configured to define at least one inlet tube and at least one outlet tube in communication with one another and connectable to the exhaust pipe and tail pipe respectively, said tubes including communication means for enabling communication of exhaust gas therefrom, said arrays of channels further defining at least one tuning tube of a selected length in communication with at least one of said inlet and outlet tubes, the length of the tuning tube extending along the abutting surfaces of the internal plates, said muffler further comprising at least one stamp formed external shell securely mounted to said plates, said external shell being stamp formed to define: inlet and outlet openings surrounding and mounted to selected portions of said inlet and outlet tubes respectively, at least one chamber enclosing the communication means in said plates, and at least one stamp formed low frequency resonating chamber in communication with the tuning tube formed by the plates.*

*24. An exhaust muffler comprising:*

*a pair of stamp formed internal plates secured in face to face abutting relationship and defining an inlet tube and an outlet tube having communication means therein for enabling communication of exhaust gas therefrom, a pair of generally registered apertures extending through said internal plates, and a tuning tube having a selected length extending from said outlet tube to said apertures, the length of the tuning tube extending along the abutting surfaces of the internal plates; and*

*a pair of stamp formed external shells secured to and substantially surrounding said internal plates, said external shells being stamp formed to define a low frequency resonating chamber surrounding and in communication with said apertures in said internal plates and to define an expansion chamber surrounding the communication means in said tubes.*

*25. A muffler comprising a pair of internal plates disposed in face to face abutting relationship, said internal plates being stamp formed to define at least one inlet tube, at least one outlet tube in communication with said inlet tube, a plurality of tuning tubes having selected lengths in communication with at least one of said inlet and outlet tubes and a corresponding plurality of substantially enclosed low frequency resonating chambers in communication respectively with each said tuning tube, the length of each said tuning tube extending along the abutting surfaces of the internal plates, said tubes comprising communication means for enabling communication of exhaust gas therefrom, said muffler further comprising a pair of external shells substantially surrounding said internal plates and secured thereto, said external shells being stamp formed to define at least one expansion chamber in communication with said communication means.*

* * * * *